Jan. 2, 1934.     O. SIMMEN     1,941,500
INTERNAL COMBUSTION ENGINE ELECTRIC INSTALLATION FOR VEHICLES
Filed Sept. 23, 1931     2 Sheets-Sheet 1
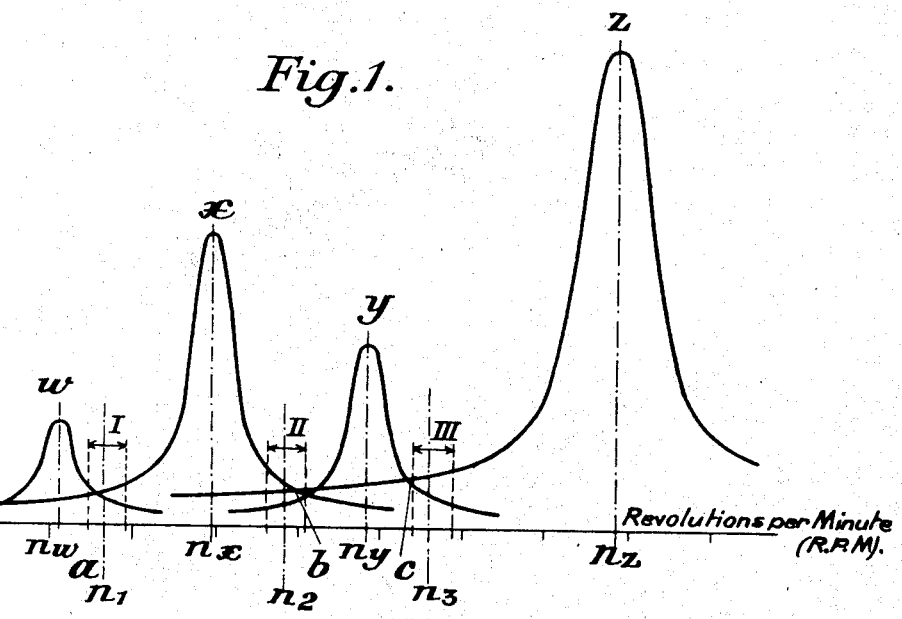
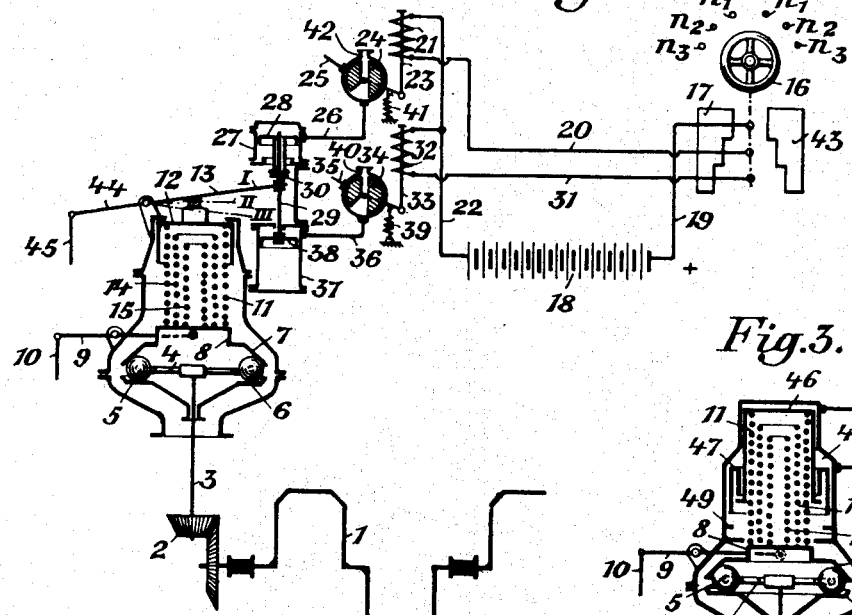
INVENTOR:
Oscar Simmen
BY
Pennie, Davis, Marvin & Edmonds
ATTORNEY.

Fig. 4

Patented Jan. 2, 1934

1,941,500

UNITED STATES PATENT OFFICE 1,941,500

INTERNAL COMBUSTION ENGINE - ELECTRIC INSTALLATION FOR VEHICLES

Oscar Simmen, Erlach, Switzerland, assignor to the firm of Sulzer Freres Societe Anonyme, Winterthur, Switzerland Application September 23, 1931, Serial No. 564,488, and in Switzerland September 30, 1930

6 Claims. (Cl. 123—97)

This invention relates to internal combustion engine-electric installations for vehicles.

In such installations an internal combustion engine is arranged to drive an electric generator, current from the generator being supplied to the driving motor or motors of the vehicle. Although the current supplied to the motor or motors can be controlled, for example by varying the field excitation of the generator, without altering the speed of the internal combustion engine, it is desirable, when only a small current is required for the driving motors to decrease the speed of the engine and thus to reduce the wear on the moving parts thereof which would take place if the engine were run continuously at its maximum speed, irrespective of the power demand for driving the vehicle.

The present invention relates to such installations of the kind in which the engine has two or more operating speeds and the invention has as its object to provide an improved arrangement for regulating the engine speed.

According to this invention a speed regulator or governor for the engine is provided with a device, such as a spring, which is adapted to be brought into operation during the change from one operating speed to another and is arranged to control the governor setting and characteristics so that the speed variations permitted to the engine are substantially the same in the neighbourhood of each operating speed and in each case the range of these variations will be outside the critical speeds of the engine. Conveniently a series of springs are associated with the governor and are arranged to be brought into operation successively as each operating speed of the engine is changed to the next higher operating speed.

Preferably the device for controlling the governor setting is brought into operation by a control switch forming part of the reversing controller of the vehicle. This control switch may be so interlocked with the main speed controller of the vehicle that the governor is set for the lowest operating speed of the engine when the vehicle is stationary. If desired the timing of the fuel supply injection may be adjusted automatically by movement imparted by the member which controls the governor device.

The following is a description by way of example of one arrangement according to the invention and of a modification thereof with reference to the accompanying drawings in which Figure 1 is a diagram showing the position of the operating speeds with reference to the additional stresses on the crankshaft caused by torsional oscillations.

Figure 2 shows diagrammatically an engine governor and a control device.

Figure 3 shows also diagrammatically, a modified form of governor, and

Fig. 4 is a diagrammatic detail of the switch device.

In the curves shown in Figure 1 the additional stresses on the crank shaft of an internal combustion engine due to torsional oscillations are plotted as ordinates against the speed of the engine as abscissæ, the peak values $w$, $x$, $y$ and $z$ corresponding to the maximum stresses which are obtained at the critical speeds $n_w$, $n_x$, $n_y$ and $n_z$. Between these peak values are minimum values of stresses indicated at $a$, $b$ and $c$.

In order therefore to avoid undue stress of the crank shaft the engine must be operated at one or other of the speeds $n_1$, $n_2$ or $n_3$ corresponding to the minimum stress values. Furthermore the maximum permissible speed variation in the neighbourhood of these operating speeds must be limited as indicated at I, II and III in order to maintain the engine speed outside the critical speeds.

In practice the speed $n_3$ is used when the maximum output of the engine is required, the tractive effort exerted by and the speed of the vehicle being controlled by regulating the current supplied from the generator to the vehicle motors in any suitable manner. When, however, the maximum output of the engine is not required, as, for example, when starting, during slow running, during running with a light load (without a trailer) or on a straight level or downhill track, the output of the generator required to maintain the vehicle at a desired speed may be obtained when the engine is running at one or other of the operating speeds $n_1$ or $n_2$, full control of the vehicle speed being obtained as before by electrical control independently of the engine speed.

Referring now to Figure 2, the internal combustion engine is indicated by a crank shaft 1, the generator coupled to the engine and the driving motor or motors of the vehicle which are connected to the generator, being omitted for the sake of simplicity. The shaft 1 drives, through a bevelled gear 2, the shaft 3 of a governor having pivoted arms 4 carrying flywheel masses consisting of balls 5 at their ends, the balls 5 normally resting on a lower ball race 6.

When the engine is operating the governor shaft 3 rotates and centrifugal force causes the balls 5 to rise carrying with them an upper ball race 7 mounted on a spring plate 8. The plate 8 is connected to one end of a lever 9 pivoted on the fixed case of the governor and connected at its other end, by a rod 10, to a control member (not shown) for the engine, for example, to the engine fuel supply regulator, so that the speed of the engine is reduced as the plate 8 is raised.

The upward movement of the plate 8 is balanced by concentric helical springs 11, 14 and 15 arranged between this plate and an adjustable upper spring plate 12. In the position shown in Figure 2 the governor is set for the first operating speed I and the spring 11 only is operative since the upper ends of the springs 14 and 15 do not engage the plate 12. In order to set the governor for the second speed II the plate 12 is moved downwardly until its underside engages the upper end of the spring 14, the two springs 11 and 14 thus cooperating to balance the upward force of the governor balls. The governor is set for the third operating speed III by further downward movement of the plate 12, so that it also engages the upper end of the spring 15 and the forces exerted by the three springs add together to balance the upward force exerted by the flywheel masses of the governor.

The position of the adjustable plate 12 is controlled by a lever 13 pivoted to the case of the governor and to the plate 12, the three positions of the lever, as indicated by the full line I and the chain lines II and III respectively, corresponding to the settings of the governor for the three operating speeds I, II and III.

The control lever of the governor is operated by two compressed air cylinders 27 and 37, the lever 13 being connected to a piston rod 29 which has one end arranged to slide in a piston 28 in the cylinder 27 and the other end positively connected to a piston 38 in the cylinder 37.

The compressed air cylinders 27 and 37 are respectively controlled by valves 24 and 34 which are normally held by springs 41 and 39 in the positions in which the cylinders 27 and 37 are connected to the atmosphere through ports 42 and 40 respectively. The lever 13 of the governor is thus normally maintained in the position I for the first operating speed.

A control switch 16 which may, conveniently, be incorporated in the reversing switch of the vehicle is provided with contacts and cooperating segments 17 and 43 for controlling a circuit for solenoids 21 and 32 for actuating the valves 24 and 34 respectively. The control switch is arranged to be moved in either direction from a neutral position in which it is shown, in accordance with the direction in which the vehicle is to move, there being three positions $n_1$, $n_2$ and $n_3$ corresponding to the three operating speeds in both the forward and reverse directions F and R. When the control switch 16 is moved in the forward direction the segment 17 controls the solenoid circuits whilst when it is moved in the reverse direction these circuits are controlled by the segment 43.

In the neutral position of the control switch 16 the solenoids are de-energized and, the valves 24 and 34 being held in the open position by their springs 41 and 39, the governor is set for the operating speed I. When the control switch 16 is moved to position $n_1$ the positive side of a battery 18 is connected through a wire 19 to the segment 17 or 43. The solenoids remain de-energized however and the governor, since it is still controlled by the spring 11, retains its setting for the first or lowest operating speed.

Movement of the control switch to the position $n_2$ connects the segment 17 or 43 through a wire 20 to one side of the solenoid 21, so that a circuit is completed for its solenoid from the positive side of the battery 18, the wire 19, the segment 17 or 43, the wire 20, the coil of solenoid 21 and the wire 22 to the negative side of the battery. The solenoid 21 then operates its plunger 23 to move the valve 24 into the position in which a supply of compressed air from a pipe 25 is connected through a pipe 26 to the cylinder 27. The piston 28 in this cylinder moves downwardly and, engaging a stop 30 on the piston rod 29, moves this rod and thus the lever 13 into the position II for the second operating speed.

When the control switch 16 is moved into the position $n_3$, the segment 17 or 43 connects the positive side of the battery 18 to both conductors 20 and 31 so that the solenoid 32 for operating the valve 34 is also energized. When this solenoid operates, its plunger 33 moves the valve 34 into the position in which a supply of compressed air from a pipe 35 is connected through the pipe 36 to the cylinder 37. The piston 38 thus moves downwardly so that the piston rod 29 moves the lever 13 into the position III, the end of the rod 29 sliding freely in the piston 28.

Figure 4:
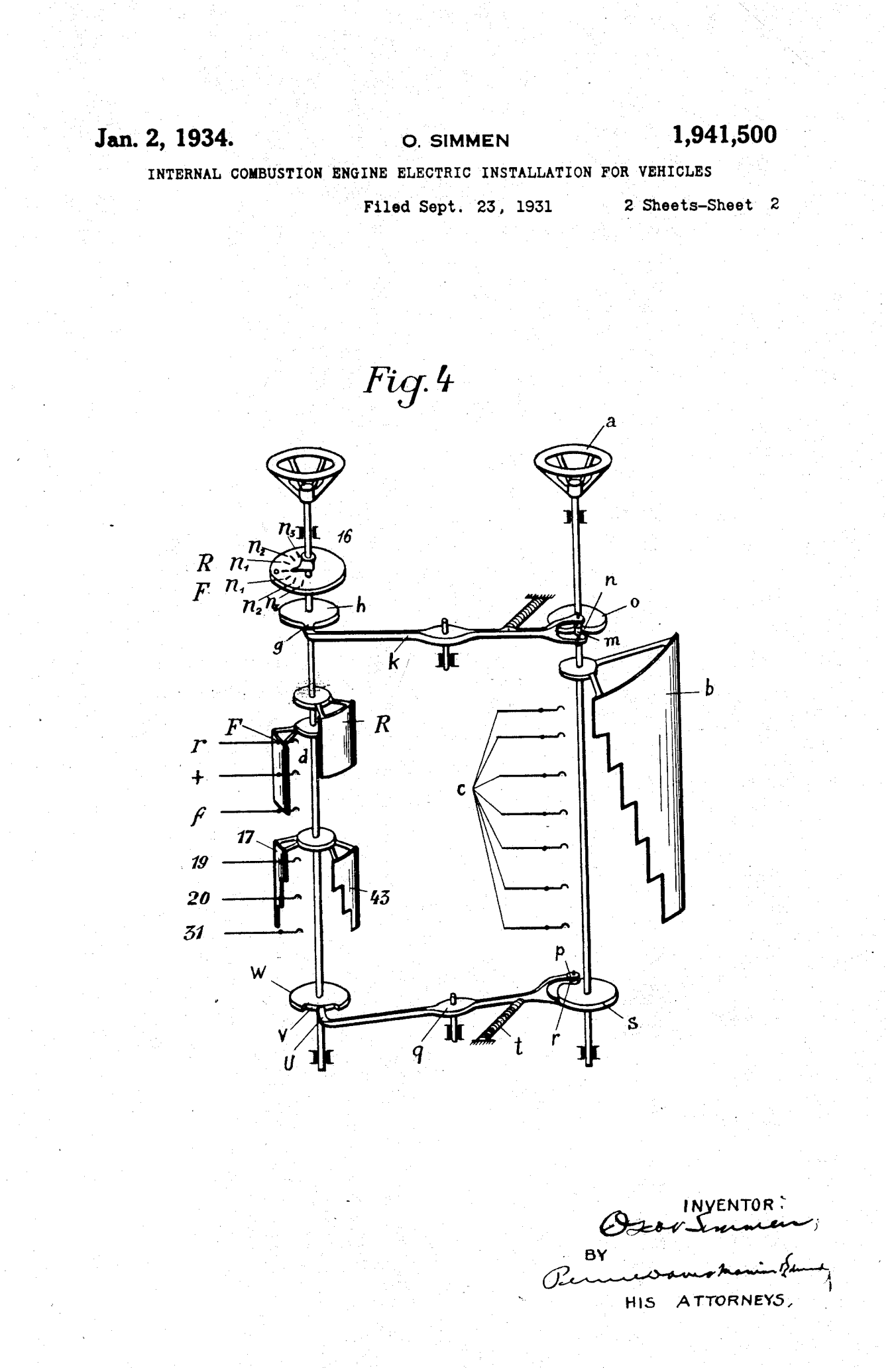

In Fig. 4, showing the switch device 16 in detail, the controller $a$ for adjusting the rate of speed is represented with a contact segment $b$ which bridges the contact fingers $c$ while rotating the hand wheel $a$. Next thereto the switch 16 proper can be seen and is provided at the upper half of the shaft with two contact segments F, R for adjusting the forward drive and the backward drive which do not come in contact with the contact fingers $d$ in the zero position of the switch 16, thus disconnecting the current and according to the adjustment of the switch 16 bridge the connection $f$ with the positive conductor for forward drive and/or the line $r$ with the positive conductor for backward movement. At the same time, two more contact segments 17 and 43 are provided on the shaft of the lever 16 which correspond to the segments 17 and 43 of the other figures, and which according to the position of the lever 16 $n_1$, $n_2$, $n_3$ connect or disconnect the springs 14, 15 in the manner described in the application.

Moreover, Fig. 4 shows an interlocking between the driving switch and the lever 16 in two respects. As the lever is constructed as a forward and backward switch, it displaces in its zero position in a generally customary manner the driving switch $a$, inasmuch as the cam $g$ of the cam dial $h$ prevents a torsion of the twin lever $k$ which would be necessary for lifting the roll $m$ from the blocking incision $n$ of the blocking dial $o$ connected with the driving switch $a$, in order that the driving switch $a$ can be brought from its zero position into one of the switching positions. Below the contact segments of the driving switch $a$ and the lever 16 further interlocking is provided. In the zero position of the driving switch $a$, the roll $p$ of the twin lever $q$ is drawn into the incision $r$ of the blocking dial $s$ connected to the driving switch $a$ by means of the spring $t$, so that the blocking hook $u$ of the twin lever $q$ engages the incision $v$ of the blocking dial $w$ connected to the lever 16 and renders it impossible that in the zero position of the driving switch $a$, the lever 16 can be placed in any but the one further position $n_1$ which corresponds to the lowest number of rotations of the internal combustion engine to be adjusted. Not until the driving switch $a$ is turned out of its zero position for starting the blocking dial $s$ turns off the twin lever $q$ for such a distance that the blocking hook $u$ leaves the incision $v$ and renders it possible to turn by the remaining portion of the blocking dial $w$ so that the lever 16 can be switched further from $n_1$ to $n_2$ and/or $n_3$.

It will be appreciated that the addition of a spring such as the spring 14 or 15 to alter the governor controlling force during the change from one speed to the next higher speed modifies the setting of the governor and that by suitably choosing the relative dimensions of the several springs the speed variation of the engine as controlled by the governor can be maintained substantially the same for each operating speed.

It will be apparent that when the control switch 16 is moved from position $n_3$ to position $n_2$ the solenoid 32 is de-energized and the valve 34 is moved by the spring 39 to the position in which the cylinder 37 is connected to the atmosphere through a port 40. The piston 38 then rises in the cylinder and the lever 13 is moved to the position II. When the control switch 16 is returned to the position $n_1$ the solenoid 21 is de-energized and, the pressure being removed from the cylinder 27, the lever 13 returns to position I.

In the modified form of governor shown in Figure 3 the upper spring plate is formed as a piston 46 and is surrounded near its lower end by an annular piston 47. The pistons 46 and 47 are arranged in a cylinder so that compressed air can be admitted through a pipe 36 above the main piston 46 or through a pipe 26 into a space 48 above the annular piston 47. The supply of compressed air to the pipes 26 and 36 is controlled by the valves 24 and 34 respectively as in the arrangement shown in Figure 2. Thus when the valve 24 is operated compressed air is admitted through the pipe 26 and forces the annular piston 47 downwardly until it reaches a stop 49, this piston carrying with it the main piston so that the upper end of the piston 46 engages the springs 11 and 14 thus setting the governor for the speed II. When the valve 34 is operated compressed air from the pipe 36 forces the main piston 46 downwardly so that the spring 15 is brought into operation and the governor is set for the speed III. The opening of the valves 34 and 24 and the discharge of the compressed air from the cylinder alters the settings of the governor in the reverse sequence as in the arrangement shown in Figure 2.

It will be appreciated that the arrangement according to the invention ensures that movement of the control switch to change the operating speed of the engine automatically effects a corresponding change in the governor setting. Thus the critical speeds $n_w$, $n_x$ and $n_y$ are passed through quickly independently of the driver and the engine cannot operate at a critical speed owing to the limits of variation in the neighbourhood of each speed as controlled by the governor. Hence the arrangement automatically prevents dangerous stresses being set up in the crank shaft 1 and also enables the driver to concentrate his attention entirely on the driving and speed control of the vehicle.

If desired the lever 13 may be provided with an extension 44, indicated in Figure 2, which is connected by an arm 45 to the fuel injection valve or other suitable controlling member so that the timing of the fuel supply injection can be varied automatically in accordance with the setting of the governor and is thus suitably adjusted for the various speeds.

It will be appreciated that the above description is by way of example only and that modifications may be made within the scope of the invention. Thus the governor setting may be controlled by other members having an effect equivalent to that of the helical springs shown and such members, or the springs, may be actuated by any suitable control mechanism which may be mechanical, electrical, pneumatic or hydraulic other than the electro-pneumatic mechanism shown. Further, if desired, pneumatic valves controlling the governor setting may also be arranged to control compressed air cylinders for regulating the fuel supply so that this supply is regulated by the control switch as well as automatically by the governor.

I claim:—

1. In an internal combustion engine-electric installation for vehicles of the kind described, the combination with a speed regulator or governor for the engine, of a device, such as a spring, adapted to be brought into operation during the change from one operating speed to another and arranged to control the governor setting and characteristics so that the speed variations permitted to the engine are substantially the same in the neighbourhood of each operating speed and in each case the range of their variations will be outside the critical speeds of the engine.

2. In an internal combustion engine-electric installation as claimed in claim 1 the arrangement of a series of springs associated with the governor and arranged to be brought into operation successively as each operating speed of the engine is changed to the next higher operating speed.

3. In an internal combustion engine-electric installation as claimed in claim 1 the arrangement of the device for controlling the governor setting being brought into operation by a control switch forming part of the reversing controller of the vehicle.

4. In an internal combustion engine-electric installation as claimed in claim 1 the arrangement that the timing of the fuel supply injection is adjusted automatically by movement imparted by the member which controls the governor device.

5. In an internal combustion engine-electric installation as claimed in claim 1 the arrangement that a control switch for varying the governor setting is so interlocked with the main speed controller of the vehicle that the governor is set for the lowest operating speed of the engine when the vehicle is stationary.

6. In an internal combustion engine-electric installation for vehicles of the kind described, the combination with an engine-speed regulator or governor having a series of springs, of a member for controlling the operation of the springs, cylinders with pistons operatively connected to the control member, valves controlling the admission of actuating fluid to the cylinders, solenoids for operating the valves and a control switch for the solenoid circuits arranged so that the solenoids can be energized in turn to bring the springs into operation successively as each operating speed of the engine is changed to the next higher operating speed, the control switch preferably being arranged adjacent to the driver's stand.

OSCAR SIMMEN.